July 2, 1940.  R. H. GOULD  2,206,252
ELECTRICAL METER
Filed Dec. 2, 1938  2 Sheets-Sheet 1
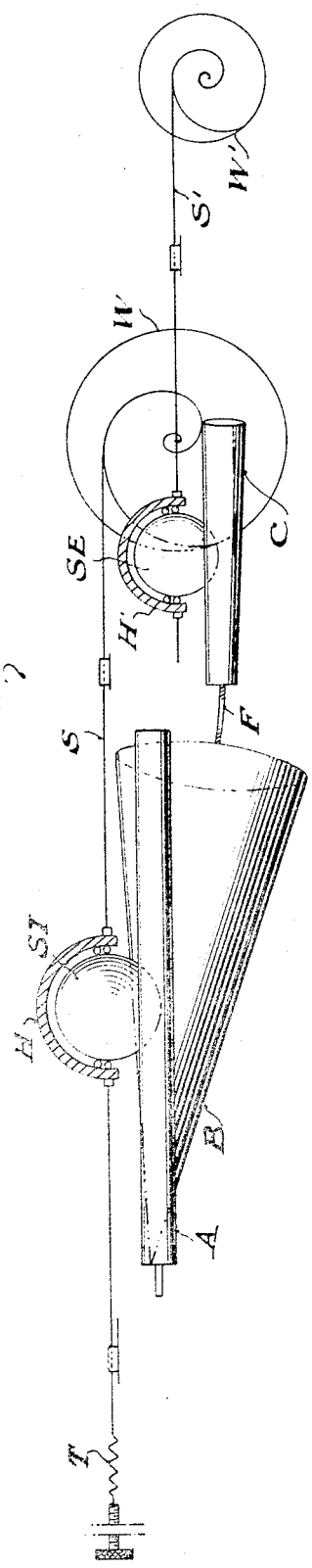
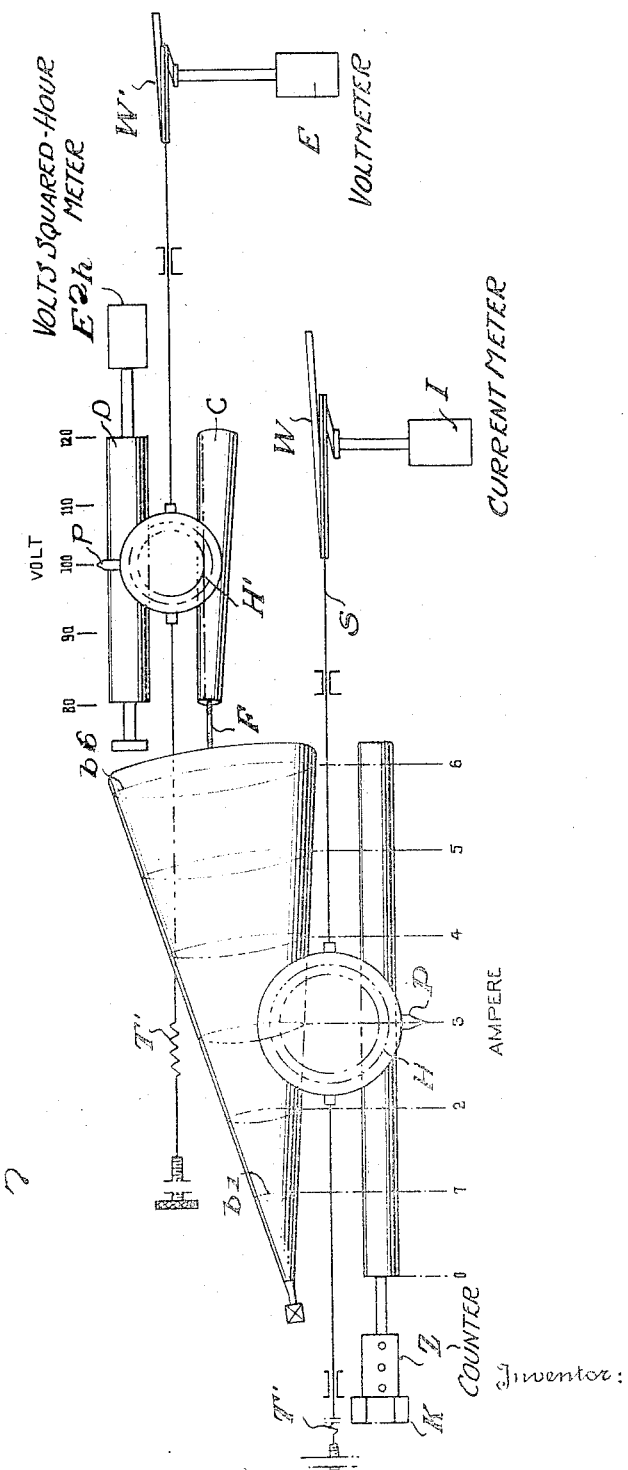

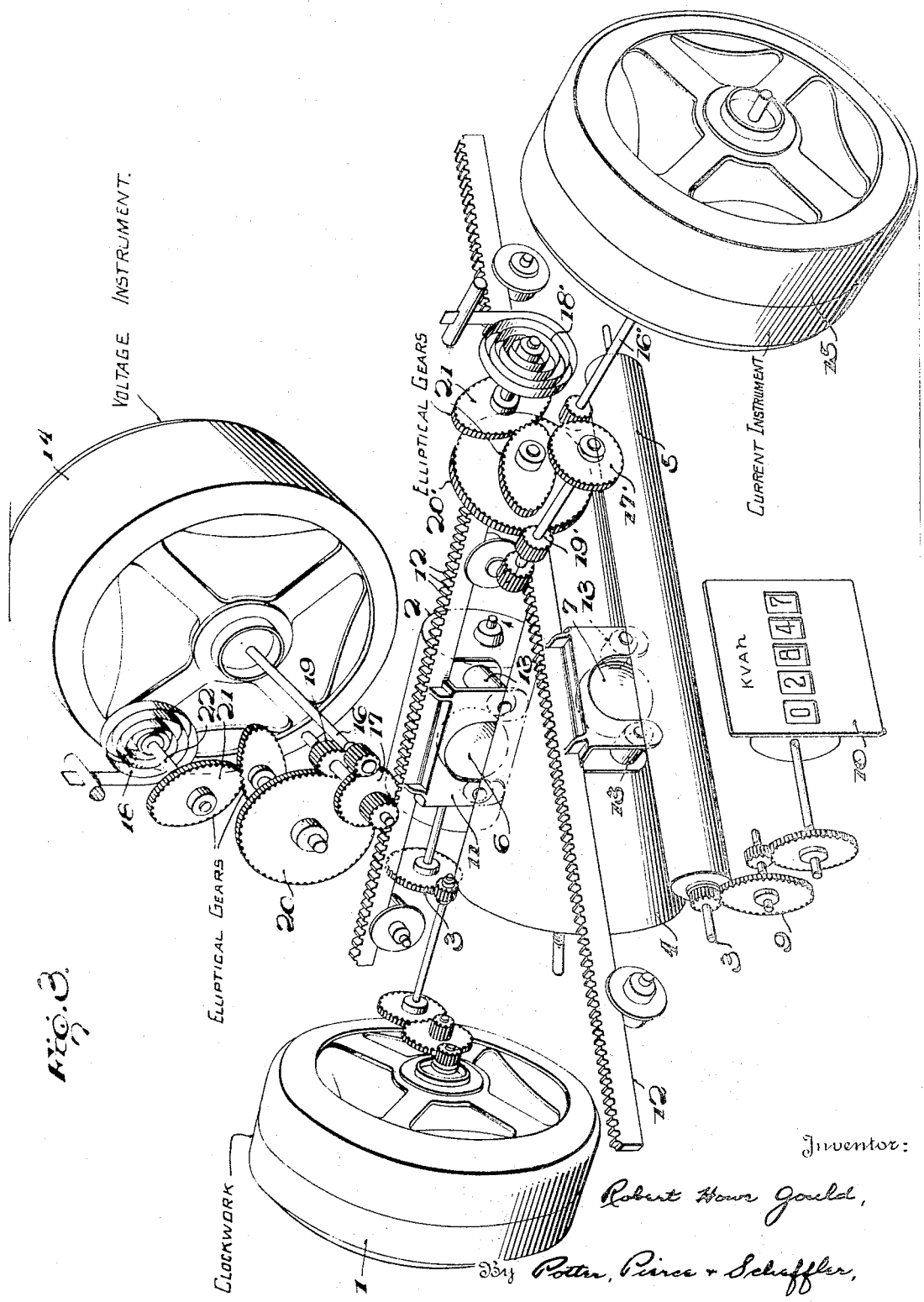

Patented July 2, 1940

2,206,252

UNITED STATES PATENT OFFICE 2,206,252

ELECTRICAL METER

Robert Howe Gould, Johannesburg, Transvaal,
Union of South Africa

Application December 2, 1938, Serial No. 243,652
In Germany November 27, 1937

13 Claims. (Cl. 171—34)

This invention relates to electrical meters and particularly to meters for measuring the "apparent energy" expended in a load or a transmission line.

Objects of this invention are to provide apparent energy meters having a variable gearing of simple design for altering, in accordance with the instantaneous values of current and voltage, the rates of transmission between voltage and current measuring mechanisms and an indicating device such as a counter, an impulse transmitter or the like. More specifically, an object is to provide an apparent energy meter of the type stated in which the variable gearing includes a cone and a cylinder coupled by a ball that is adjustable along the cone, to vary the effective pitch diameter or circumferential speed of the cone. A further object is to provide an apparent energy meter including a cylinder that is rotated at constant speed, a second cylinder for actuating a counter or indicating device, a cone between the two cylinders, a ball between the cone and each cylinder, and voltage and current measuring instruments for adjusting the respective balls along the cone.

These and other objects and advantages of the invention will be apparent from the following specification when taken with the accompanying drawings in which:

Figs. 1 and 2 are diagrammatic plan and side elevations, respectively, of an embodiment of the invention; and Fig. 3 is a perspective view of another embodiment.

In the drawings, the reference character A identifies a cylinder that is coupled to and rotated by a cone B through a ball or sphere SI that rests upon cylinder A and the cone B. The cylinder A drives a counter Z and a cam K of the impulse transmitter of a maximum pointer indicator, not shown. The cone B is rotated at the same speed as the cone C through any desired type of mechanical coupling such as, for example, the illustrated flexible shaft F, and the cone C is rotated by the cylinder D through a ball SE. The balls SI and SE are rotatably mounted in cages or housings H, H' that have pointers P for cooperation with current and voltage scales, respectively, adjacent the cylinders A and D. The axes of the cylinders A and D are horizontal and each coupling ball travels in a straight line when that element of the cone which contacts the ball is also horizontal. The paths of the balls along the cylinders and cones are shown in dotted lines in Fig. 2.

A volts-hour meter $E^2h$ rotates the cylinder D at a speed which is proportional to the square of the voltage, and a voltmeter E turns a worm $W'$ on which is wound a cord $S'$ for displacing the cage $H'$ of the ball SE in opposition to the tension exerted by a tension spring $T'$. The worm element $W'$ converts the quadratic characteristic of an alternating current voltmeter to a linear relationship between the measured voltage and the displacement of the cord $S'$, and the pitch of the worm may be calculated to compensate inherent errors in the instrument or in auxiliary devices, for example instrument transformers.

The cage H of the ball SI is adjusted in a similar manner by a current meter I which acts through a worm W and cord S against the tension of a spring T.

The method of operation of the apparatus can be best understood by reference to assumed numerical values. If the load current range is from 0 to 6 amperes, as indicated by the scale graduations, the diameter of the cone B is equal to the cylinder diameter at the contact line $b1$ of ball SI and cone B when the pointer P stands at the 1 ampere graduation. The cone diameter increases from zero at one end to six times the cylinder diameter at contact line $b6$ at the other end, and the effective cone diameter thus varies directly with the reading of the pointer P on the current scale. The cone B is rotated, as will be explained, at a rate dependent on voltage, and the position of the ball SI is determined by the meter I in accordance with current. The number of revolutions imparted to the cylinder A, and thereby to the counter X, is therefore proportional to volt-ampere-hours.

The cone B is rotated in synchronism with cone C through the coupling F, and the rotation of cone C is controlled jointly by the speed of cylinder D and the position of the ball SE. Assuming a normal potential of 100 volts and a range of variation of from 80 to 120 volts, the cone C has a diameter which tapers from 0.8 to 1.2 times the diameter of the cylinder D. The ball SE is displaced along the cone C by the voltmeter E and, for a meter reading of 100 volts, the ball engages the cone C at the midpoint where the diameter is equal to that of the cylinder. Assuming that the meter $E^2h$ rotates the cylinder D at 100 revolutions per minute for a voltage of 100 volts, the cone C will also rotate at that speed since the ball SE is adjusted for a 1-to-1 drive for 100 volts at the voltmeter E. If the potential drops to 80 volts, the cylinder speed falls to 64 revolutions per minute as the speed of the meter $E^2h$ varies as the square of the voltage. The decreased voltage at voltmeter E results in a displacement of the ball SE towards the smaller end of the cone C, i. e., to that position at which the cone diameter is 0.8 times the cylinder diameter. The cone rotates more rapidly than the cylinder in the ratio of 10 to 8, and the cone thus makes 80 revolutions for the assumed 64 revolutions of the cylinder. Similarly, a voltage rise above the normal 100 volts increases the speed of cylinder D as the square of the voltage but the ball SE is simultaneously moved to the right to decrease the ratio of transmission between elements D and C. The cone C therefore rotates at a speed proportional to the voltage, and drives the cone B at the same rate.

The described apparatus thus provides an automatically variable transmission ratio between the driving meter $E^2h$ and the counter X which results in a registration of volt-ampere-hour values at the counter X.

The taper of the cones may be selected in accordance with the range of variation in the magnitudes of the quantities which affect the transmission to or from the cones. The particular values mentioned above are included for clearness of explanation and the invention is not limited to any particular range of voltage or current values.

The apparatus shown in Fig. 3 is of somewhat simpler design as a clock mechanism replaces one of the control instruments, only one cone element being employed. An electrical or mechanical clockwork mechanism 1 rotates a cylinder 2 at constant speed through gearing 3. A cone 4 lies between the cylinder 2 and the driven cylinder 5, and balls 6, 7 provide friction drive couplings between the cylinders and the cone. The axes of the cylinders are horizontal and the inclination of the cone is such that the balls travel along straight line, horizontal paths. The adjustments of the balls along the cone in accordance with voltage and current result in a movement of the cylinder 5 in proportion to apparent energy, and this movement or number of revolutions may be employed to actuate an indicator, an impulse transmitter or a counting mechanism. As illustrated, gearing 9 couples the cylinder 5 to a counting mechanism 10 that registers the rotations of the cylinder in terms of apparent energy, i. e., kilovolt-ampere-hours.

Each ball 6, 7 rests on the cone 4 and the associated cylinder, and the weight of the ball provides the necessary friction for transmitting rotary motion to and from the cone. The guide cage 11 for each ball depends below a sliding rack bar 12 and has rollers 13 that extend transversely to the rack at each side of the ball.

The positions of balls 6 and 7 are controlled by the voltage instrument 14 and the current instrument 15, respectively, through similar mechanisms and only one will be described in detail, the corresponding parts of the two mechanisms being identified by primed numerals.

The instrument 14 has a pivotally mounted moving system that tends to displace the staff 16 in proportion to the square of the voltage. The staff 16 is coupled to the rack 12 through gearing 17, preferably step-down gearing when the instrument 14 develops a relatively low torque; and to a spiral spring 18 through a specially shaped gear train which imparts a square law characteristic to the force exerted by the spring 18 on the gearing 17. A small gear 19 on a shaft of the gearing 17 meshes with a larger diameter gear 20 that is secured to one member of a pair of elliptical gears 21, the other member being fixed to the staff 22 that carries the inner end of the coil spring 18. The elliptical gears are preferably designed to compensate for errors in the instrument and associated elements and thus permit the use of simple and inexpensive instrument transformers. The gear trains are designed for a displacement of the rack 12 over the entire range of voltage variation within an angular movement of the elliptical gears of not more than 90°. A greater displacement of the elliptical gears will result in a loss of the square law relation which compensates the square law characteristic of the current instrument to insure a movement of the rack 12 and ball 6 as a linear function of the voltage.

The desired linear motion of the "current" controlled ball 7 is obtained from the square law instrument 15 through a similar gear and spring mechanism.

The method of operation will be understood from the operation of the previously described apparatus. The cylinder 2 is rotated at constant speed, say one revolution per minute, and the transmission through the voltage-controlled ball 6 results in the rotation of the cone 4 in proportion to volt-hours. The transmission from cone 4 to cylinder 5 is controlled by the ball 7 in accordance with current, and the number of revolutions imparted to cylinder 5 thus varies directly with volt-ampere-hours. The counter 10 is thus the indicator of an apparent energy meter as it registers the elapsed rotations of the cylinder 5.

The supporting structure for the apparatus and the case for housing the parts are not shown but may be of any usual or desired design. The various movable elements, the instruments and the counter will preferably be mounted on a unitary base, as is common practice, but other arrangements may be used.

The described embodiments of the invention indicate that there is considerable latitude in the design and construction of the novel meters and it is to be understood that various changes may be made in the gearing and in the choice and design of the control instruments without departure from the spirit of my invention as set forth in the following claims.

I claim:

1. An apparent energy meter comprising a measuring instrument responsive to the square of the load current, a measuring instrument responsive to the square of the load voltage, an indicating device, a cylindrical rotatable element for actuating said indicating device in accordance with the number of revolutions of said element, a driving mechanism including a cylindrical element, adjustable transmission gearing coupling said driving mechanism to said first cylindrical element, said gearing including a cone and means comprising balls coupling said cone to each of said cylindrical elements, and means actuated by said instruments for displacing said balls along the respective cylindrical elements to vary the transmission ratio of said gearing in accordance with instantaneous values of current and of voltage respectively.

2. An apparent energy meter as claimed in claim 1, wherein said driving mechanism includes a voltage squared-hours meter for rotating said second cylindrical element.

3. An apparent energy meter comprising a cone, means including a voltage-squared hours meter for rotating said cone in proportion to volt-hours, a cylinder adjacent said cone, a ball resting on said cone and cylinder, and current-responsive means for displacing said ball along said cone in accordance with instantaneous values of load current, and a counting mechanism actuated by said cylinder.

4. An apparent energy meter as claimed in claim 3, wherein said means for rotating said cone includes a cylinder rotated by said voltage squared-hours meter, a variable ratio transmission mechanism between said meter-rotated cylinder and said cone, and means for adjusting said transmission in accordance with the instantaneous load voltage.

5. An apparent energy meter as claimed in claim 3, wherein said means for rotating said cone includes a cylinder rotated by said voltage squared-hours meter, a cone adjacent said meter-rotated cylinder and coupled to the first cone, a ball resting on the second cone and the meter-rotated cylinder, and means including a voltage measuring instrument for adjusting the second ball along the associated cone.

6. In an apparent energy meter, a volt-ampere-hour counter, means including a variable ratio transmission gearing for actuating said counter in accordance with instantaneous values of load voltage and load current, a measuring instrument having a pivoted system deflected in response to the square of one of said instantaneous values, and means actuated by said pivoted system to adjust said gearing as a linear function of the value measured by said instrument.

7. In an apparent energy meter, a measuring instrument having a movable system displaceable angularly in response to the square of one of the values of load current and load voltage, a gearing comprising a cylinder and a cone coupled by a ball, and means actuated by the movable system of said instrument for displacing said ball along said cone as a linear function of the measured value.

8. The invention as claimed in claim 7, wherein said displacing means includes a worm of quadratic pitch carried by said movable system, a cord wound on said worm, and a cage housing said ball, said cord being connected to said cage.

9. The invention as claimed in claim 7, wherein said displacing means includes a mechanical coupling between said movable member and a cage housing said ball, a spiral spring, and means including a pair of meshed elliptical gears coupling said sping to said ball cage to oppose displacement thereof by said movable member.

10. An apparent energy meter comprising a horizontally arranged cylinder, means rotating said cylinder at constant speed, a cone, a second cylinder at the opposite side of said cone, a ball at each side of said cone and resting on the same and the adjacent cylinder, means for displacing said balls along said cone in accordance with instantaneous values of load current and load voltage respectively, and a volt-ampere-hour indicator actuated by the second cylinder.

11. An apparent energy meter comprising a pair of horizontally arranged cylinders, a cone between said cylinders and having an element adjacent and parallel to each cylinder, a ball at each side of the cone and resting on the same and the adjacent cylinder, a clockwork mechanism for rotating one cylinder, an indicating mechanism actuated by the other cylinder, means including a voltmeter for displacing one ball as a linear function of the instantaneous load voltage, and means including an ammeter for displacing the other ball as a linear function of the instantaneous load current.

12. In an apparent consumption meter, current and voltage measuring devices, a counter, and variable speed mechanism controlled by said devices for operating said counter; said mechanism including gearing comprising a cylinder and a cone coupled by a displaceable ball, the axis of the cylinder being horizontal and the axis of the cone being inclined to position in a horizontal plane that element of the cone along which said ball is displaced.

13. In an apparent consumption meter, current and voltage measuring devices, a counter, and variable speed mechanism including two co-operating sets of cylindrical and conical surfaces with the cooperating surfaces of each set coupled by a ball, means controlled by the respective devices for displacing said balls along the associated cooperating surfaces, each cylindrical surface having a horizontally arranged axis and each conical surface having an axis inclined to the horizontal to position in a horizontal plane that conical surface element along which the associated ball is displaced.

ROBERT HOWE GOULD.